US008645700B2

(12) United States Patent
Smith et al.

(10) Patent No.: US 8,645,700 B2
(45) Date of Patent: Feb. 4, 2014

(54) DNSSEC INLINE SIGNING

(75) Inventors: David Smith, Arlington, VA (US); James Gould, Leesburg, VA (US); Tarik Essawi, Leesburg, VA (US); David Blacka, Reston, VA (US); Srikanth Veeramachaneni, South Riding, VA (US)

(73) Assignee: Verisign, Inc., Reston, VA (US)

( * ) Notice: Subject to any disclaimer, the term of this patent is extended or adjusted under 35 U.S.C. 154(b) by 33 days.

(21) Appl. No.: 13/098,032

(22) Filed: Apr. 29, 2011

(65) Prior Publication Data
US 2012/0278626 A1 Nov. 1, 2012

(51) Int. Cl.
*H04L 9/32* (2006.01)

(52) U.S. Cl.
USPC ............................................ 713/176

(58) Field of Classification Search
None
See application file for complete search history.

(56) References Cited

U.S. PATENT DOCUMENTS

| | | | | |
|---|---|---|---|---|
| 6,823,454 | B1 * | 11/2004 | Hind et al. | 713/168 |
| 7,680,955 | B2 * | 3/2010 | Huang et al. | 709/245 |
| 7,930,428 | B2 * | 4/2011 | Drako | 709/245 |
| 7,941,517 | B2 | 5/2011 | Migault et al. | |
| 8,140,669 | B2 * | 3/2012 | Christenson et al. | 709/224 |
| 8,347,100 | B1 | 1/2013 | Thornewell et al. | |
| 2006/0143711 | A1 * | 6/2006 | Huang et al. | 726/23 |
| 2008/0260160 | A1 * | 10/2008 | Moreau | 380/277 |
| 2009/0187649 | A1 | 7/2009 | Migault et al. | |
| 2010/0049982 | A1 | 2/2010 | Migault et al. | |
| 2012/0017090 | A1 * | 1/2012 | Gould et al. | 713/176 |
| 2012/0054497 | A1 | 3/2012 | Korhonen | |
| 2012/0096166 | A1 | 4/2012 | Devarapalli et al. | |
| 2012/0110144 | A1 | 5/2012 | Rossi | |
| 2012/0110326 | A1 | 5/2012 | Rossi | |
| 2012/0110334 | A1 * | 5/2012 | Rossi | 713/176 |
| 2012/0117621 | A1 | 5/2012 | Kondamuru et al. | |

OTHER PUBLICATIONS

B. Wellington, Domain Name System Secuirty (DNSSEC) Signing Authority (RFC 3008), Nov. 1, 2000, The Internet Society.*
Testing and Implementation Requirements for the Initial Deployment of DNSSEC in the Authoritative Root Zone, Oct. 29, 2009, pp. 1-9.

(Continued)

*Primary Examiner* — Kaveh Abrishamkar
(74) *Attorney, Agent, or Firm* — MH2 Technology Law Group LLP

(57) ABSTRACT

Systems and methods of performing incremental DNSSEC signing at a registry are described in which digital signature operations may be performed as part of a single transaction including DNS add, update, and/or delete operations and the like. Exemplary methods may include receiving a domain command from a requester, the domain command including an identifier of a domain. The received domain command may be executed with respect to data stored by the registry for the domain. As part of an individual transaction including the execution of the domain command, the registry may also sign DNSSEC records for the domain using a private key of an authoritative server. After the DNSSEC records have been signed, the registry may incrementally publish the signed DNSSEC records to a separate server. Exemplary methods may also include "took-aside" operations in which, for example, add, update, and/or delete operations may be executed on data stored in a registry database and reported to a requester, prior to applying digital-signatures to the DNSSEC data. After reporting that the instructions have been executed, the registry may generate a digital signature based on the add, update, and/or delete changes, and commit the digital signature to a registry resolution database.

23 Claims, 9 Drawing Sheets

(56) References Cited

OTHER PUBLICATIONS

J. Schlyter et al., DNSSEC Key Management Implementation for the Root Zone (Draft), May 11, 2010, pp. 1-14.

F. Ljunggren, DNSSEC Practice Statement for the Root Zone KSK Operator, May 21, 2010, pp. 1-40.

ICANN, Policy on Transfer of Registrations between Registrars, http://www.icann.org/en/transfers/policy-en.html, Nov. 7, 2008, pp. 1-4.

Joseph Gersch et al., Deploying DNSSEC in Large-Scale Operations, CATCH Conference, Mar. 4, 2009, pp. 1-20.

Okubo et al, DNSSEC Practice Statement for the Root Zone ZSK Operator, May 28, 2010, pp. 1-37.

Gersch, J. et al., "Deploying DNS Security (DNSSEC) in Large-Scale Operational Environments," Conference for Homeland Security, Cybersecurity Applications & Technology, IEEE, Piscataway, NJ, Mar. 3, 2009, pp. 169-180.

Kolkman, W., "DNSSEC Operational Practices, Version 2; draft-ietf-dnsop-rfc4641bis-06.txt," Internet Engineering Task Force, IETF, Standard Working Draft, Internet Society (ISOC) 4, Rue Des Falaises Ch—1205, Geneva Switzerland, No. 6, Mar. 11, 2011, pp. 1-68.

European Patent Examiner Barbara Figiel, Extended European Search Report for European Application No. 12002985.5, dated Aug. 6, 2012, pp. 1-7, published by the European Patent Office.

LJunggren Kirei AB A-M Eklund-Lowinder Set Okubo Verisign F: "Dnssec Signing Policy & Practice Statement Framework; draft-ietf-dnsop-dnssec-dps-framework-00.txt", Internet Engineering Task Force, IETF; Standard Working Draft, Internet Society (ISOC) 4, Rue Des Falaises CH—1205 Geneva, Switzerland, Nov. 25, 2009, pp. 1-28. XP01506-5786.

Nathan Meyer et al., "F5 and Infoblox DNS Integrated Architecture: Offering a Complete Scalable, Secure DNS Solution", Feb. 1, 2010, pp. 1-18, XP55020951 htttb://web.archive.org/web/20100326145019/http://www.f5.com/ pdf/white—papers/infoblox—wp.pdf, accessed Mar. 5. 2012.

\* cited by examiner

DNSSEC INLINE SIGNING

BACKGROUND OF THE INVENTION

The Domain Name System (DNS) is the part of the Internet infrastructure that translates human-readable domain names into the Internet Protocol (IP) numbers needed to establish TCP/IP communications over the Internet. That is, DNS allows users to refer to web sites, and other resources, using easier to remember domain names, such as "www.en.example.com," rather than the numeric IP addresses, such as "123.4.56.78," which are machine readable addresses used by software to communicate with computers on the Internet. Each domain name is made up of a series of character strings (labels) separated by dots. The right-most label in a domain name is known as the "top-level domain" (TLD). Examples of well-known TLDs are ".com"; ".net"; ".org." etc. Each TLD supports second-level domains, listed immediately to the left of the TLD, e.g., "example" in "www.example.com." Each second-level domain can support a number of third-level domains located immediately to the left of the second-level domain, e.g., "en" in "www.en.example.com." There can be additional level domains as well. For example, a domain with additional domain levels could be "www.landscape.photos.example.com."

It should be noted that a single IP address, e.g., one assigned to a single server, can support numerous domain names. That is, different domain names may resolve to the same server, that can then determine what content to provide based on the requested domain name and/or additional non-domain information. This is sometimes referred to as virtual hosting.

Additional non-domain information may be included in a Uniform Resource Identifier ("URI") structure that includes the domain name. For example, a "path" part is a sequence of segments separated by a forward slash ("/"). This information may be included immediately to the right of the domain name, such as the "blog" in "www.example.com/blog/today.htm," and may be used by a server or other receiving device to identify and deliver specific content or run particular code. Other examples of non-domain information may include queries and fragments, the specifics of which are understood by those of ordinary skill in the art and are not discussed in detail herein. Combinations of this information may be included in web page hyperlinks that navigate a user to another section of the same page or to another web page.

Thus, as can be seen in the various examples provided above, and as appreciated by those of skill in the art, a domain, such as the second level domain "example.com", may contain a variety of different Internet accessible information with different addresses and other means of identification.

The actual registration of domain names is performed by companies referred to as domain name registrars ("registrars"). Registrars register domain names with registries. For example, an end user submits to a registrar a domain name for registration and provides an IP address to which the domain name should resolve. The registrar communicates with the registry to create a registry database record that can be used to resolve the domain name to the IP address provided by the end user and indicates the identity of the registrar through which the domain name was registered. Except for the expiration of the domain name registration at the registry, typically only the registrar designated in the domain name record at the registry can modify or delete registry database information about a domain name. An end user can switch registrars by following certain domain transfer procedures. Registrars may also act as a hosting provider, or the end user may have the domain hosted by a separate third-party domain hosting service.

A zone file is a text file that describes a portion of the DNS called a DNS zone. A zone file is organized in the form of resource records (RR) and contains information that defines mappings between domain names and IP addresses and other resources. The format of zone files is defined by a standard, with each line typically defining a single resource record. A line begins with a domain name, but if left blank, defaults to the previously defined domain name. Following the domain name is the time to live (TTL), the class (which is almost always "IN" for "internet" and rarely included), the type of resource record (A, MX, SOA, etc.), followed by type-specific data, such as the IPv4 address for A records. Comments can be included by using a semi-colon and tines can be continued by using parentheses. There are also file directives that are marked with a keyword starting with a dollar sign.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central register to be continually consulted and updated. The DNS resolution process allows for users to be directed to a desired domain by a reverse lookup process whereby the user enters the desired domain, and the DNS returns appropriate IP numbers. During the DNS resolution process, a request for a given domain name is routed from a resolver (e.g., a stub resolver) to an appropriate server (e.g., a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers. In addition, home networking routers may implement DNS caches and proxies to improve efficiency in the local network.

Although the distributed nature of the DNS provides significant advantages in terms of the efficiency of the overall system it also makes the system vulnerable to certain types of malfunctions and/or attacks at various nodes in the system. One particular problem that can occur is referred to as DNS cache poisoning. DNS cache poisoning occurs when data are introduced into a DNS name server's cache database that did not originate from authoritative DNS sources. This may result from deliberate attacks on a name server, or it may be an unintended result of, for example, a misconfigured DNS cache or improper software design of a DNS applications. Thus, DNS cache poisoning can result in (1) resolution requests failing, such as when inaccurate or misconfigured IP address information is provided, or (2) a requesting user's resolution request being directed to a malicious site that spoofs the genuine domain and is used to illicitly obtain information such as account passwords, or to distribute malicious content, such as computer worms or viruses, that are delivered to the requesting user.

The Domain Name System Security Extensions (DNSSEC) is a suite of Internet Engineering Task Force (IETF) specifications for securing certain kinds of information provided by the DNS as used on IP networks. DNSSEC provides for the signing of DNS-ready zone files, ensuring origin authentication and data integrity for DNS data, as well as authenticated denial of existence. In general, answers provided within DNSSEC are digitally signed, and, by checking the digital signature, a DNS resolver is able to check if the information corresponds to the information on the authoritative DNS server. DNSSEC uses public-key cryptography for the digital signatures and authentication. The DNSKEY record is authenticated via a chain of trust, starting with a set of verified public keys for the DNS root zone, which is a trusted third party.

To implement DNSSEC, several new DNS record types were created or adapted to use with DNSSEC, including RRSIG, DNSKEY, DS, NSEC, NSEC3 and NSEC3 PARAM. For example, when DNSSEC is used, each authoritative answer to a DNS lookup will contain an RRSIG DNS record in addition to the record type that was requested. The RRSIG record is a digital signature of the answer DNS resource record set. The digital signature can be verified by locating the correct public key found in a DNSKEY record. The DS record is used in the authentication of DNSKEYs in the lookup procedure using the chain of trust. NSEC and NSEC3 records are used to provide the authenticated denial of existence responses for DNS records that do not exist.

The requirements of DNSSEC involve the use of different keys, stored both in DNSKEY records and from other sources, to form trust anchors. There are, for example, Key Signing Keys (KSKs), which are used to sign DNSKEY records, and Zone Signing Keys (ZSKs), which are used to sign other records. Because the ZSKs are under the control and use of a specific DNS zone, they can be switched more easily and more often. As a result, ZSKs can generally be much shorter (in terms of byte length) than KSKs, while still offering an acceptable level of protection.

Although protocols have been developed for the employment of DNSSEC, including the use of KSKs and ZSKs, there are numerous aspects of operating DNSSEC enabled domains, at the registrar and registry levels, that have not been addressed and/or optimized for large-scale use. For example, the ability to process large numbers of signatures in short periods of time, is limited to the common practice of signing entire zones based on changes to the zone. Accordingly, there are ongoing needs to further improve the functionality and/or efficiency of operations related to DNSSEC management and the signature functions required for DNSSEC records.

SUMMARY OF THE INVENTION

Most current DNSSEC techniques involve "distributed" signing of DNSSEC data, i.e. signing techniques that are distributed amongst various users, DNS providers, etc. Currently, users wishing to adopt DNSSEC have the following basic options:
1. Build their own DNSSEC solution using a combination of third party and open source software along with a set of either software keys or hardware keys.
2. Use a DNSSEC key management and a signing appliance like Secure64 DNS Signer, BlueCat Networks, Xelerance DNSX Secure, Signer, and Infoblox. Such appliances may provide various aspects of key management and zone signing, but require hardware to be installed at the client's site. It should be noted that DNSSEC key management and signing appliances require installation of hardware at the user's site, require more hands-on management of key material, and do not support more than a single user.
3. Use a Managed DNS solution that has been updated to support DNSSEC, Managed DNS providers include zone management and zone publishing features. DNSSEC enablement allows a client to "turn on" DNSSEC for a managed DNS zone, but require the user to migrate or outsource their DNS hosting to the managed DNS provider.

One approach for a domain registry to add support for DNSSEC would also be to accept the DNSSEC Delegation Signer (DS) information, generate an unsigned zone and then sign the entire zone for publishing. However, with the introduction of DNSSEC into vast registries, such as the .com and .net registries, inefficiencies in the various distributed and other signing techniques for DNSSEC data, particularly with respect to large zones, bring the potential for resolution problems including delays and resolution failures. Such problems can have significant detrimental effects on e-commerce and other high-traffic sites. The present subject matter may provide benefits in the efficient signing of DNSSEC enabled zones at an authoritative source, such as a registry responsible for the domain, through various incremental signing techniques. For example, when approached from the perspective of the registry, or other entity that is aware of or alerted to particular changes in DNS data, portions of the DNS data, which are the subject of add, change, amid/or delete operations, and the like, may be identified, signed and variously committed and reported without resigning an entire zone. In embodiments, the DNS update operation and the signing of the affected DNSSEC records may be performed as part of a single transaction (e.g. an atomic, consistent, isolated and durable unit of work) aspects of which may be referred to herein as "inline signing."

In embodiments, DNSSEC Inline Signing may include implementing the DNSSEC signing inline with the domain command. For example, the responsible registry may accept the DNSSEC DS information and create the signed DNSSEC records within the same transaction, and may thereafter incrementally publish the signed information out to the DNS from one authoritative source. Such authoritative signing may provide benefits over other distributed signing techniques, but, in general, may also present challenges in scalability, which are addressed by further aspects of the present subject matter. According to aspects of the invention, a registry database may act as the single authoritative source for all of the records published in a DNSSEC zone via DNSSEC Inline Signing.

As described further herein, systems and methods of performing incremental DNSSEC signing at a registry, or other entity that is aware or alerted to particular changes in DNS data, may include performing digital signature operations as part of a single transaction including DNS add, update, and/or delete operations and the like. Exemplary methods may include receiving a domain command from a requester, the domain command including an identifier of a domain. The received domain command may be executed with respect to data stored by the registry for the domain. DNSSEC data changes may also be identified based on the received domain command. As part of an individual transaction including the execution of the domain command, the registry may also sign DNSSEC records for the domain using a private key, for example, a private key of an authoritative server. Embodiments may include committing the transaction at the registry. As used herein, a transaction commit may be understood as an operation that applies all data manipulations within the scope of the transaction, and persists the results to the database. Embodiments may include propagating the committed transaction to the DNS infrastructure. In embodiments, the registry may, for example, incrementally publish the signed DNSSEC records to separate servers.

According to aspects of the invention, embodiments may include systems and methods for performing DNSSEC signing at a registry including receiving a domain command from a requester. The domain command may include an identifier of a domain and, for example, at least one of an add, modify, and/or delete command regarding the domain. Embodiments may include executing the received domain command with respect to data stored by the registry for the domain. As part of an individual transaction including the execution of the domain command, DNSSEC records for the domain may be digitally signed, for example, using a private key of an authoritative server. The signed DNSSEC records may be incrementally published to a separate server, for example, a DNS server.

Embodiments may include wherein the domain command includes one or more DNSSEC Delegation Signer (DS) elements. In embodiments, the domain command may include one or more DNSKEY elements that generates one or more associated DNSSEC Delegation Signer (DS) records.

In embodiments, the requester may be, for example, a registrar, a DNS service provider or a registrant. In embodiments, the domain may be a second, or higher, level domain under a Top Level Domain of the registry.

In embodiments, the method may be performed for domains from a plurality of registrars by an authoritative server of the registry. In embodiments, the signing of DNS records may be performed for at least two domains from a plurality of registrars by an authoritative server of the registry.

In embodiments, the signing of DNS records may be performed by a plurality of signing servers for the registry.

Embodiments may also include committing changes to NSEC or NSEC3 chains based on the at least one of add, update, delete command.

According to further aspects of the invention, embodiments may include systems and methods for performing DNSSEC signing at a registry including receiving a first command from a requester to at least one of add, update, or delete a DNSSEC-related domain name to, in, or from the registry, and executing instructions from the first command to add, update, and/or delete data stored in a registry database. In embodiments, the execution of the command may not include applying digital-signature data. In embodiments the registry, or other service, may report to the requester that the instructions have been executed. Separate from the execution of the instructions from the first command, which may also be after the reporting of execution, a digital signature may be generated based on the add, update, and/or delete changes, and the digital signature may be committed to a registry resolution database. Embodiments may also include publishing non-DNSSEC changes and/or DNSSEC changes, based on the domain command, to the DNS. In embodiments, non-DNSSEC changes and DNSSEC changes may be published by the system asynchronously to the DNS.

According to further aspects of the invention, embodiments may include systems and methods for performing DNSSEC signing at a registry including receiving a first command from a requester to at least one of add, update, or delete a DNSSEC-related domain name to, in, or from the registry; executing instructions from the first command to add, update, and/or delete data stored in a registry database, wherein the execution does not include applying digital-signature data; generating a database entry indicating pending DNSSEC changes related to the first command; generating a digital signature based on the add, update, and/or delete changes; and clearing the database entry. Embodiments may also include publishing the database entry to the DNS.

Additional features, advantages, and embodiments of the invention may be set forth or apparent from consideration of the following detailed description, drawings, and claims.

Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION OF THE INVENTION

Figure 1:
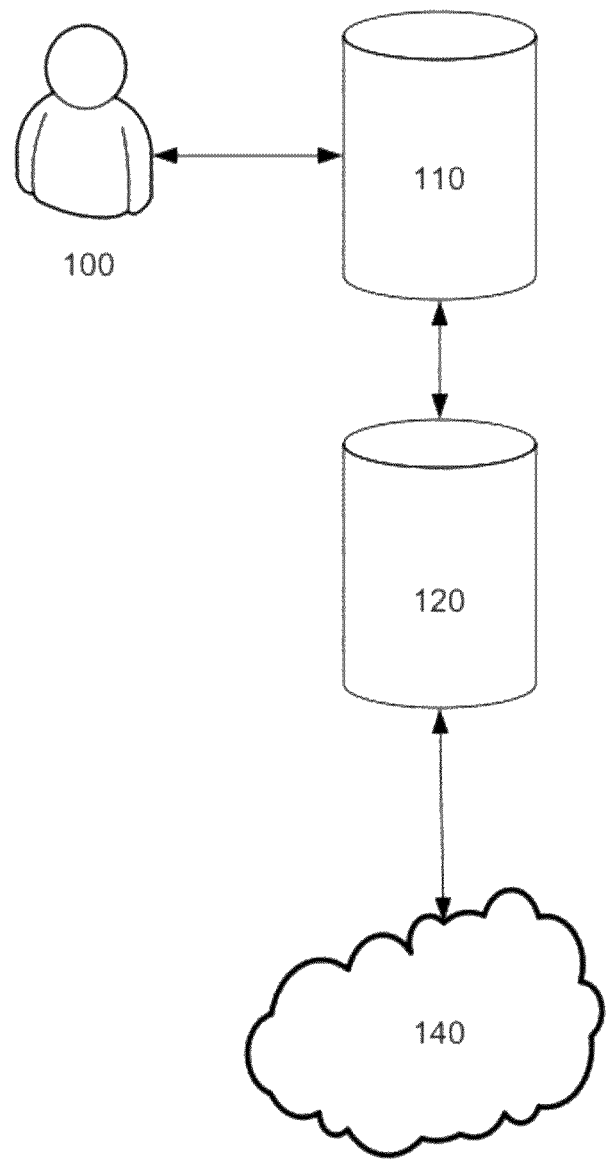
FIG. 1 depicts relationships of an inline signing arrangement according to aspects of the invention.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a server" is a reference to one or more server and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

As used herein, unless otherwise limited, a registrar may be understood to be any entity or organization that interacts with a domain-name registry and allows registrants to create and update domain-name resources.

As used herein, unless otherwise limited, a registrant may be understood to be any person or organization that interacts with a registrar to create and update a domain-name resource.

As used herein, unless otherwise limited, a DNS hosting provider may be understood to be any entity or organization that hosts content on its servers on behalf of a registrant, providing DNS provisioning and resolution capabilities for that content (e.g., assigns IP addresses and operates nameservers capable of resolving domain names to those IP addresses that it manages).

As used herein, unless otherwise limited, a database should be understood broadly to include, for example, various electronic storage applications formatted to store and access discreet and/or related information for use by computer systems, e.g., local and/or distributed file systems, data files, data warehouses, structured databases, relational databases, local and/or distributed databases, hybrid databases, discreet data, structures and/or schema within databases, etc.

According to aspects of the present invention, systems and methods for supporting a domain-sponsorship transfer with DNS hosting transfer may include, for example, a domain transfer between registrars, which may be referred to as a "domain-sponsorship transfer," and a transfer in DNS hosting, which may be referred to as a "DNS hosting transfer." In the case of domain transfers, both transfers may typically be included because many registrars are DNS hosting providers, and registrants often take advantage of the DNS hosting provided by their registrars. The following example shows the steps involved in a domain-sponsorship transfer between registrars that includes a DNS hosting transfer between those same registrars.

Embodiments of the invention may provide various inline signing techniques to allow large-scale DNSSEC providers, such as registries, to process large numbers of DNS changes, including DNSSEC signature data, in an efficient and coherent manner.

Zone Signing Overview

As described above, DNSSEC was designed to deal with cache poisoning and a set of other DNS vulnerabilities such as man in the middle attacks and unauthorized data modification in authoritative servers. Its major objective is to provide origin authentication and integrity protection for DNS data. The public key infrastructure (PKI) may be used as means of public key distribution. DNSSEC provides a verification mechanism for DNS data and is not an encryption mechanism. It allows a security-aware resolver to verify that the zone data that has been received is signed by the administrator of the zone who holds the private key.

The DNSKEY Resource Record

A zone may have one or more key pairs, each of which includes private key and public key. The private keys may be stored securely in a domain name database and used to sign zone data. The public keys may be stored in the database and also stored in the signed zone data as DNSKEY resource records. The public keys are used to verify zone data. DNSKEY records typically have the following data elements:
Flags: "Zone Key" and "Secure Entry Point"
Protocol: Fixed value of 3 (for backwards compatibility)
Algorithm: The public key's cryptographic algorithm.
Public key: Public key data.

A DNSKEY Resource Record ("RR") may be either a Zone Signing Key (ZSK) or a KeySigning Key (KSK). The Key Signing Keys (KSKs) will have a SEP flag set so that they can be distinguished from the ZSKs in the DNSKEY RRset. The Key Signing Keys (KSKs) are used to sign other DNSKEY resource records and are used to build a chain of authority to the data that needs to be validated.

The RRSIG Resource Record

The RRSIG resource record holds the DNSSEC signature of a resource record set RRset (one or more DNS records with the same name, class, and type). DNSSEC enabled resolvers can verify the signature with a public key stored in a DNSKEY-record. The RRSIG records have the following data elements:
Type Covered: DNS record type that this signature covers.
Algorithm: Cryptographic algorithm used to create the signature.
Labels: Number of labels in the original RRSIG-record name (used to validate wildcards).
Original TTL: TTL value of the covered record set.
Signature Expiration: When the signature expires.
Signature Inception: When the signature was created.
Key Tag: A short numeric value which can help quickly identify the DNSKEY-record which can be used to validate this signature.
Signer's Name: Name of the DNSKEY-record which can be used to validate this signature.
Signature: Cryptographic signature.

The DNSKEY RRs are signed by the active Key Signing Keys. Other RR sets are signed by only active Zone Signing Keys.

The NSEC Resource Record

The NSEC resource record lists two separate things: the next owner name (in the canonical ordering of the zone) that contains authoritative data or a delegation point NS RRset, and the set of RR types present at the NSEC RR's owner name [RFC38451]. The complete set of NSEC RRs in a zone indicates which authoritative RRsets exist in a zone and also form a chain of authoritative owner names in the zone. These records can be used by resolvers to verify the nonexistence of a record name and type as part of DNSSEC validation. NSEC-records have the following data elements:
Next domain name: The next record name in the zone (DNSSEC sorting order)
Record types: The DNS record types that exist for the name of this NSEC-record.

The NSEC3 Resource Record

The NSEC3 Resource Record (RR) provides authenticated denial of existence for DNSResource Record Sets. The NSEC3 RRs have the same functionality as NSEC RR, except NSEC3 uses cryptographically hashed record names to prevent enumeration of the record names in a zone. An NSEC3-record links to the next record name in the zone (in hashed name sorting order) and lists the record types that exist for the name covered by the hash value in the first label of the NSEC3-record's own name. These records can be used by resolvers to verify the non-existence of a record name and type as part of DNSSEC validation. NSEC3-records have the following data elements:
Hash Algorithm: The cryptographic hash algorithm used.
Flags: "Opt-out" (indicates if delegations are signed or not).
Iterations: How many times the hash algorithm is applied.
Salt: Salt value for the hash calculation.
Next Hashed Owner Name: The name of the next record in the zone (in hashed namesorting order).
Record Types: The record types that exist for the name covered by the ash value in the first label of the NSEC3-record's own name.

Aspects of an exemplary inline signing arrangement are shown in FIG. 1. As shown in FIG. 1, a requester 100, such as, for example, a registrant, a registrar or a DNS provider, may communicate with a registry provisioning system 110. The requester 100 may communicate commands related to an existing or new domain. For example, requester 100 may communicate commands to change DNS data managed by the registry, such as DNS data for a domain under a TLD (e.g., .com) managed by the registry. Registry provisioning system 110 may process the domain command from the requester 100 in various ways including, for example, executing change commands, e.g., add, modify, or delete commands, identifying DNSSEC data changes, identifying appropriate keys, applying digital signatures, persisting DNS and DNSSEC changes to a registry database 120, etc.

In embodiments, data provided by the registry provisioning system 110 to the registry database 120 may include DNS information for the domain and signed DNSSEC data. In embodiments, the DNS changes and the DNSSEC changes may be executed within a single transaction. Once the DNS information for the domain and signed DNSSEC data have been persisted to the registry database 120, the transaction may be committed. After transaction commit, the DNS information for the domain and signed DNSSEC data may be propagated to the broader DNS cloud 140 including other authoritative servers, recursive DNS servers, etc.

Figure 2:
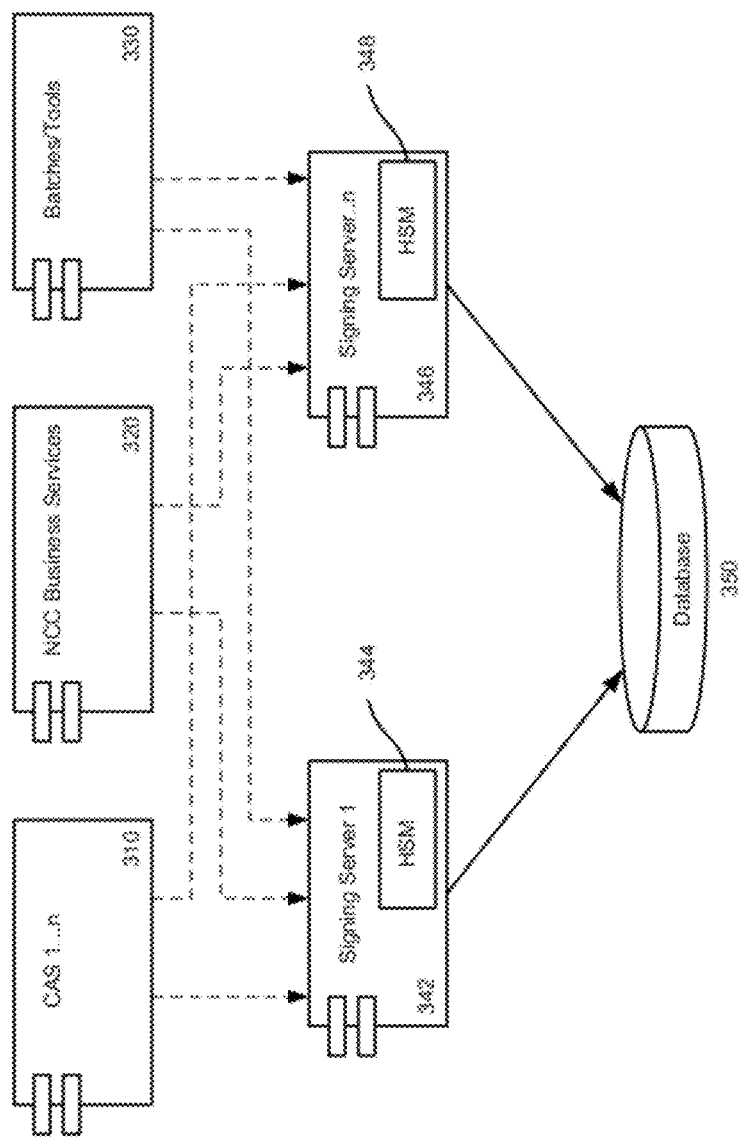
FIG. 2 depicts an exemplary process flow for signing DNSSEC data according to first aspects of the invention.
Figure 3:
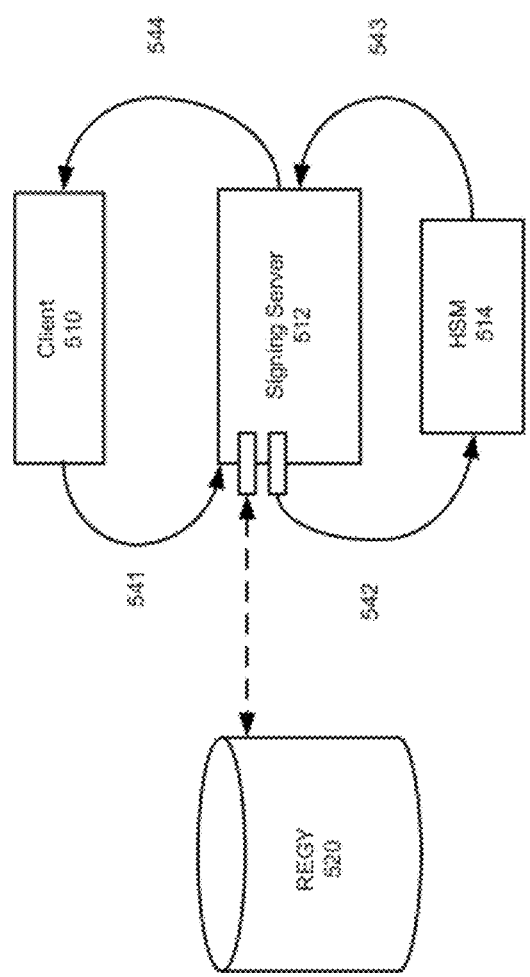
FIG. 3 depicts further details of a DNSSEC-enable signing system according to aspects of the invention.

Further details of an exemplary DNSSEC signing service are shown in FIGS. 2 and 3. It should be noted that, although the signing service configurations shown in FIG. 1-3 may be used in practicing aspects of the present invention, the inline signing techniques described herein may find applicability with a number of different signing services with various other configurations. As shown in FIG. 2, a registry, or other DNS-SEC service provider may include any number of Signing Servers 342, 346. For example, a plurality of signing servers may be including the provisioning system 110 shown in FIG. 1. Signing Servers 342, 346 may include Hardware Security Modules (HSMs) 344, 348, respectively, and/or software, which may include the actual digital signature functionality including appropriate digital signature keys. Signing Servers 342, 346 may communicate, and for example, exchange signed and unsigned DNS data, with various applications, services and tools 310, 320, and 330. Each CAS 310, NCC night Business Services 320, and Batch/Tool 330 component will have connectivity to the signing server (preferably to a set of such servers). Signing Servers 342, 346 may persist signed DNS data to a database 350. Additional details of an exemplary data flow among the applications, signing servers, HSMs, and databases are shown in FIG. 3.

As shown in FIG. 3, client 510 may represent, for example, a front end service of the provisioning system 110 shown in FIG. 1, which may be configured to identify DNSSEC data that needs to be signed by the signing server 512. The DNSSEC data to be signed may be parsed or otherwise identified based on a domain command, and provided to the signing server 512, as shown by link 541. Information such as bytes, keyType (ZSK, KSK) and TLD may be included. The signing server 512 may identify the appropriate key information and/or HSM from the transmission 541, and pass the unsigned data to the appropriate HSM 514, shown by link 542. This may include a sign command with, for example, the bytes, keyAlias, and signature algorithm.

The signing server 512 may be configured to periodically check with the database 520 for the authoritative data on which key alias to use when sending data to the HSM 514. The HSM 514 may be loaded with many keys per TLD at initialization time (some may be ZSKs, some may be KSKS) and each key may be known to the HSM 514 by an alias, keyAlias. The client 510 may be configured to tell the signing server 512 which of the two kinds of key to use (ZSK or KSK) and the TLD, and the signing server 512 may be configured to identify the current key-alias name for that kind of key when it communicates with the HSM for signing. The signing server 512 may also be forced to re-check with the database 520 for the current key aliases. This command can be issued, for example, to the signing server 512 via a JMX management interface.

The HSM 514 signs the DNSSEC data with an appropriate key, and passes the signed data back to the signing server 512 as shown by link 543. The signing server may pass signed DNSSEC data, or other data such as transaction commit information, back to the client 510 as shown by link 544.

Some examples of relevant domain command operations that may be processed according to aspects of the invention are described below.

Domain create with DNSSEC data.

During a domain creation where the user has passed along DNSSEC data (these data will be the 4 fields required for each Delegation Signer [DS] record submitted), the registry may make the following decisions and take the following actions:
Generate and store a digital signature for the DS record(s).
Determine whether the domain qualifies for publication in the zone. If so:
 Create its NSEC3 record.
 Sign the NSEC3 record.
 Identify its proper position in the NSEC3 chain (which is analogous to a linked list stored in the database) and insert that new NSEC3 record with the least change to the chain. This may involve very rapidly identifying the links in the chain that must change, locking the minimum number of them (which is 1), and performing the insertion and re-linking to end with an authentic and coherent NSEC3 chain.

Domain update with new DS data.

During a domain update with new DS data, the registrar may also include other changes to the domain. Those other changes may change the domain's zone status. Therefore the registry may:
Generate and store a digital signature for the DS record(s).
Determine whether the domain qualifies for publication in the zone and whether it is already in the zone.
 If the domain was not in the zone and now is in the zone:
 Create its NSEC3 record.
 Sign the NSEC3 record.
 Store the digital signature for the NSEC3 record.
 Identify its proper position in the NSEC3 chain and insert that new NSEC3 record with the least "blocking" on other updates to the chain. This may involve very rapidly identifying the links in the chain that must change, locking the minimum number of them, and performing the insertion and re-linking to end with an authentic and coherent NSEC3 chain.

If the domain was in the zone and now must not be in the zone:

Locate the domain's record in the NSEC3 chain.

Remove that NSEC3 record with the least "blocking" on other updates to the chain. This may involve very rapidly identifying the links in the chain that must change, locking the minimum number of them, and performing the record removal and re-linking to end with an authentic and coherent NSEC3 chain.

Domain update with removal of DS data.

During a domain update with the removal of DS data, the registrar may also include other changes to the domain. Those other changes may change the domain's zone status; for instance, if the domain has no remaining DS records after the removal, the domain no longer qualifies for the zone. Therefore the registry may:

Determine whether the domain has any remaining DS records.

If not, the registry may remove the domain from the NSEC3 chain (see below for steps). The registry may also remove the existing digital signature for the DS data that are being removed.

If so, the registry may regenerate the digital signature for the remaining DS records.

Determine whether the domain qualifies for publication in the zone and whether it is already in the zone.

If the domain was not in the zone and now is in the zone:

Create its NSEC3 record.

Sign the NSEC3 record.

Store the digital signature for the NSEC3 record.

Identify its proper position in the NSEC3 chain and insert that new NSEC3 record with the least "blocking" on other updates to the chain. This may involve very rapidly identifying the links in the chain that must change, locking the minimum number of them, and performing the insertion and re-linking to end with an authentic and coherent NSEC3 chain.

If the domain was in the zone and now must not be in the zone:

Locate the domain's record in the NSEC3 chain.

Remove that NSEC3 record with the least "blocking" on other updates to the chain. This may involve very rapidly identifying the links in the chain that must change, locking the minimum number of them, and performing the record removal and re-linking to end with an authentic and coherent NSEC3 chain.

Figure 4:
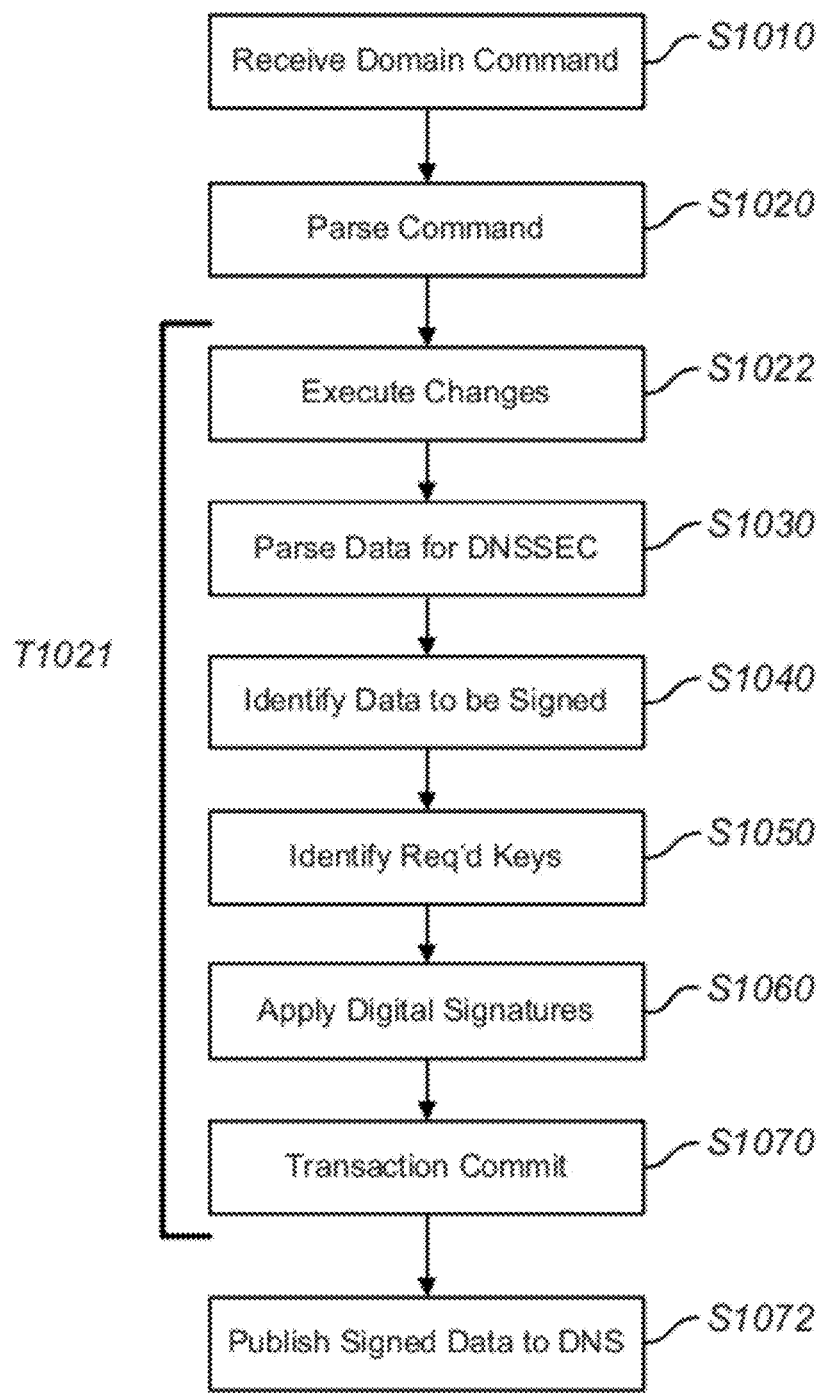
FIG. 4 depicts yet further details of a DNSSEC-enable signing system according to aspects of the invention.

Aspects of the above processes are generally shown in FIG. 4, which depicts exemplary inline signing steps as described herein. It should be noted that, unless specifically described as occurring before, or after, some other step, the steps depicted in FIG. 2 may take place in various orders, and/or contemporaneously, without departing from the scope of the invention.

The method may begin with S1010 in which a domain command, e.g., an add, modify and/or delete command, is received. The domain command may be parsed in S1020 to identify for example, the domain to which the command applies, the applicable TLD, the type of command, any DNS changes, etc. The method may continue with S1022.

In S1022, changes that have been identified in the domain command may be processed for execution. As discussed herein, the execution of such changes may be included in a single transaction, such as T1021, including a number of different database operations such as, for example, DNSSEC signature functions. In S1030 and S1040, exemplary systems such as provisioning system 110 shown in FIG. 1, may identify DNSSEC data that will be added and/or changed and/or needs to be signed or resigned based on the changes to be made, or being made, as a result of the domain command. This may involve, for example, parsing commands, operations, and/or data for DNSSEC-related changes and identifying the DNSSEC data that needs to be signed and/or resigned.

In S1050, appropriate DNSSEC keys, signature protocols, and/or appropriate HSMs, may be identified based on the data that needs to be signed. Such determinations may be made based on various factors, including, for example, the domain and/or TLD of the domain, in which the data resides.

In S1060, DNSSEC data may be signed, for example, by one or more HSMs e.g., HSMs 344, 348 shown in FIG. 2, or HSMs included in the provisioning system 110 shown in FIG. 1. As the DNSSEC data is signed, and other DNS changes are executed, the changes may be persisted to a registry database, or the like. After the required DNS changes and DNSSEC signatures for the transaction T1021 are complete, the transaction may be committed in S1070.

After the transaction commit in S1070, the DNS changes and DNSSEC signatures for the transaction T1021 may be published to the DNS in S1072. It should be noted that the method steps depicted in FIG. 4 are not an exhaustive representation of all of the related DNSSEC and DNS update functions that may be accomplished during a single transaction. For example, the various NSEC update steps, and other functions, described above in the context of various DNS update operations may, of course, also be included in the transaction T1021.

The inventors have found that the most time-consuming, and therefore the most optimized part of the DNSSEC transaction, is the generation and storage of the digital signatures, followed closely by the updating of the NSEC3 chain. It should be noted that the updating of the NSEC3 chain happens any time a domain goes into or out of the DNS zone file for the TLD of the domain. To qualify for the TLD zone file, a domain:

Must have a delegation name server defined for it.

Must not be on hold status.

Must not be deleted from the registry.

Any changes to a DNSSEC-enabled domain, therefore, have the potential to change its zone status.

As described above, the DNSSEC signing may be done synchronously inline with the transaction and persisted to the authoritative registry database. The DNS resolution can take each committed transaction in the Registry database and apply it incrementally to the DNS Servers.

According to aspects of the invention, DNSSEC signing inline with the domain commands of a domain registry may provide advantages in maintaining a highest level of data integrity by ensuring, for example, that the registry database always represents the authoritative source for what is published in DNS. In addition to the data-integrity advantage, DNSSEC signing inline also effectively implements incremental updates. For example, only a portion of the zone may be affected by an individual domain command, so both the domain command updates and the additional DNSSEC updates may be propagated to DNS as an individual unit of work, i.e. an individual transaction. This has been found by the inventors to result in very low latency in propagating domain registry updates that include DNSSEC updates to DNS.

As part of implementing the DNSSEC Inline Signing, a cluster of network available and high performance Signing Servers, such as shown in FIGS. 2 and 3, may be provided to sign the DNSSEC information. This has been found to be effective even in the context of the largest TLDs, and maintains the domain registry response time SLA's, as well as maintaining the DNS propagation SLA's with a high level of data integrity.

It should be noted that DNSSEC signing can happen after domain-update commands that do not involve the registrar submitting DS records. For example, removing all nameservers from a DNSSEC-enabled domain, would be a domain-update command where the registrar passed no DNSSEC data, but that results in generating signatures. Accordingly, although certain aspects of the invention may find applicability in responding to requests from registrars, including multiple registrars related to a given registry, the invention is not limited to such scenarios.

In addition to the above-described inline signing techniques, the inventors have also identified other methodologies that may be implemented according to aspects of the invention. For example, the inventors have developed various "downstream resolution database" and "look-aside" techniques that may find applicability in performing DNSSEC signing operations by, for example, a registry, or other managed DNS service provider. Aspects on an exemplary downstream resolution database system will be described firs with reference to FIG. 5.

Figure 5:
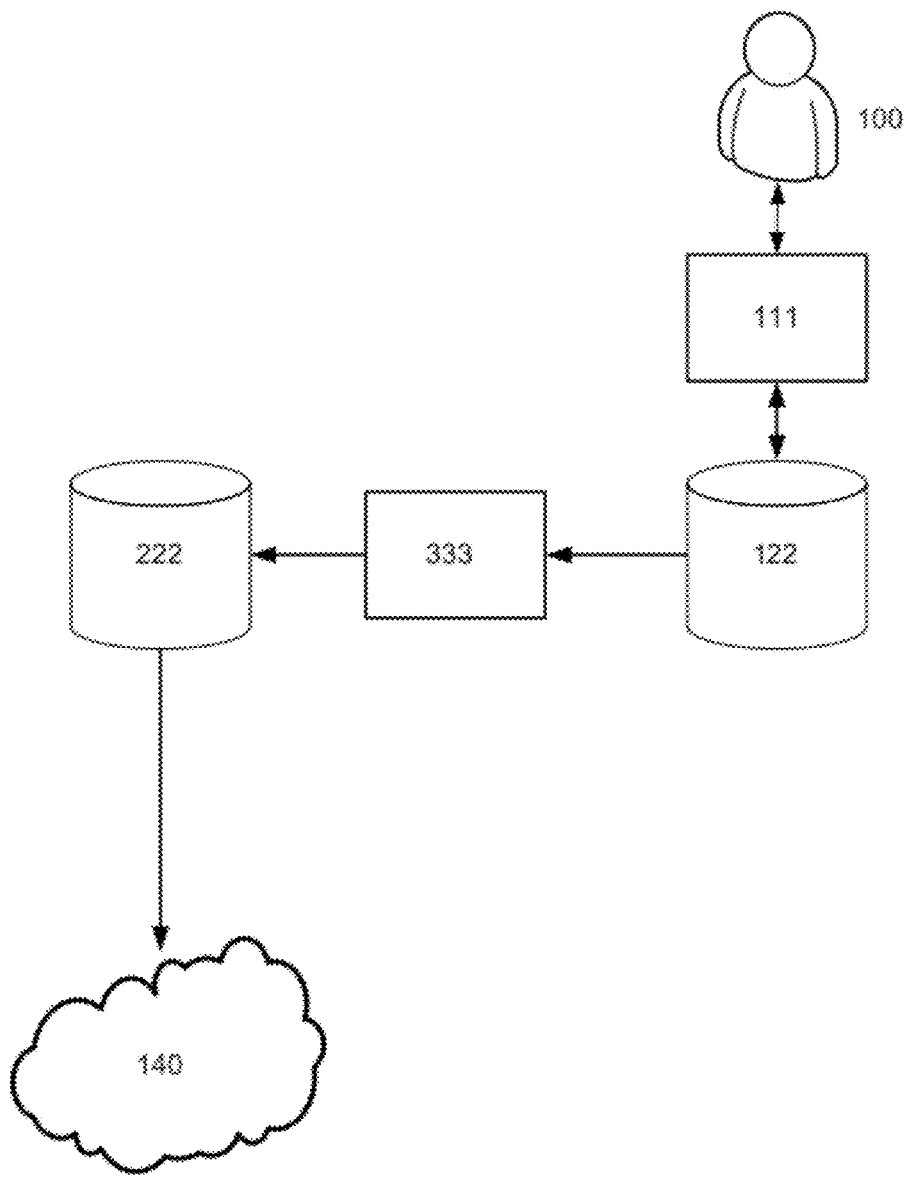
FIG. 5 depicts relationships of a downstream resolution database signing arrangement according to further aspects of the invention.

As shown in FIG. 5, a downstream resolution database technique may include the addition of a resolution database 222, and a resolution database process 333 that communicates DNS changes from a registry database 122, and the like, to the resolution database 222. As mentioned previously, as used herein "databases" should be construed broadly, and may encompass discreet data schema or tables within a database, etc. In the downstream resolution database approach, the downstream resolution database 222 may be the authoritative database for providing incremental updates to DNS 140. All of the standard domain data non-DNSSEC data) may be written to the registry database 122 based on input from the registry clients 111 with no extra DNSSEC processing. The transactions may be propagated in order from the registry database 122 to the resolution database 222 by the registry-to-resolution database process 333. The registry-to-resolution database process 333 may identify transactions that impact DNSSEC, and may execute the DNSSEC signing and record updates that are written to the resolution database 222. The resolution database 222 may, thus, be the authoritative database for the network of DNS servers. There is a one-way arrow from the resolution database 222 to the DNS 140 since the DNS servers within the cloud are an in-memory representation of what is contained in the resolution database 222.

One advantage of such an approach is that there may be little or no extra time or dependencies exposed to the registry clients for DNSSEC since the DNSSEC processes may be performed asynchronously in a separate transaction in the registry-to-resolution database process 333. In this regard, the inventors have noted that any registry that can accept DNSSEC data will need to perform the time and processor-intensive generation of digital signatures. For this reason, a registry may choose to do these signature generation tasks outside of the OLTP transactions. This would generally entail the registry:

1. receiving a command that adds, updates, or deletes a DNSSEC-related domain name to/in/from the registry.
2. committing to a registry database the data resulting from the operation, minus any digital-signature data.
3. generating the required digital signatures to reflect the changes to the DNSSEC data as a result of the OLTP transaction.
4. committing the digital signatures and other DNSSEC data, such as changes to NSEC or NSEC3 chains, to a registry/resolution database.

Separating steps 3 and 4 into their own separate database transaction may allow the registry to send a prompt reply to the customer after step 2 has completed, leaving the relatively slow steps 3 and 4 to be done asynchronously without affecting customer response times.

Figure 6:
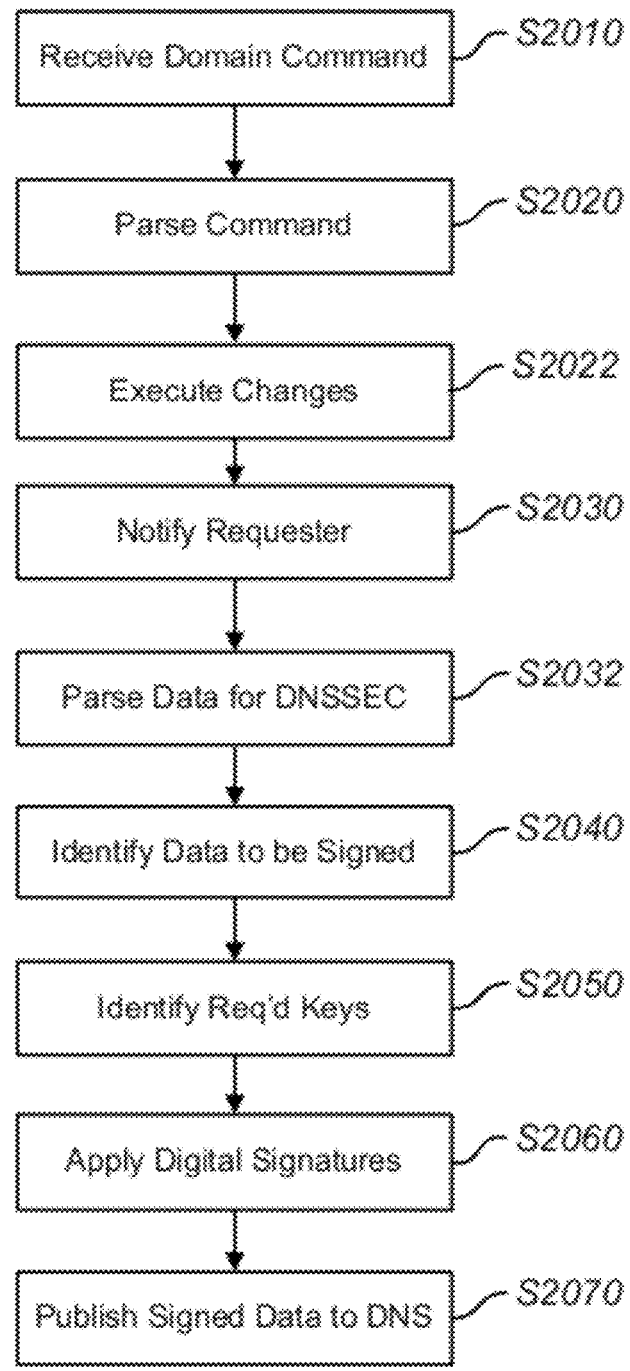
FIG. 6 depicts an exemplary process flow for a downstream resolution database signing process according to further aspects of the invention.

Aspects of the above processes are generally shown in FIG. 6, which depicts exemplary processing steps for a downstream resolution database as described herein. It should be noted that, unless specifically described as occurring before, or after, some other step, the steps depicted in FIG. 6 may take place in various orders, and/or contemporaneously, without departing from the scope of the invention.

The method may begin with S2010 in which a domain command, e.g., an add, modify and/or delete command, is received. The domain command may be parsed in S2020 to identify for example, the domain to which the command applies, the applicable TLD, the type of command, any DNS changes, etc. The method may continue with S2022.

In S2022, changes that have been identified in the domain command may be processed for execution, without processing related digital signature data. This may include committing to a resolution database the data resulting from the operation, minus any digital-signature data.

In S2030, the registry may report completion of the changes from S2022 to the customer, which may be performed regardless of the status of any DNSSEC signature functions.

In S2032 and S2040, exemplary systems such as provisioning system 110 shown in FIG. 5, may identify DNSSEC data that will be added and/or changed and/or needs to be signed or resigned based on the changes to be made, or already made, as a result of the domain command. This may involve, for example, parsing commands, operations, and/or data for DNSSEC-related changes and identifying the DNSSEC data that needs to be signed and/or resigned.

In S2050, appropriate DNSSEC keys, signature protocols, and/or appropriate HSMs, may be identified based on the data that needs to be signed. Such determinations may be made based on various factors, including, for example, the domain and/or TLD of the domain, in which the data resides.

In S2060, DNSSEC data may be signed, for example, by one or more HSMs e.g., HSMs 344, 348 shown in FIG. 2, or HSMs included in the provisioning system 110 shown in FIG. 1. As the DNSSEC data is signed, the changes may be persisted to the resolution database, e.g. the downstream resolution database 222.

In S2070, the newly-signed DNSSEC data may be published to the DNS.

Figure 7:
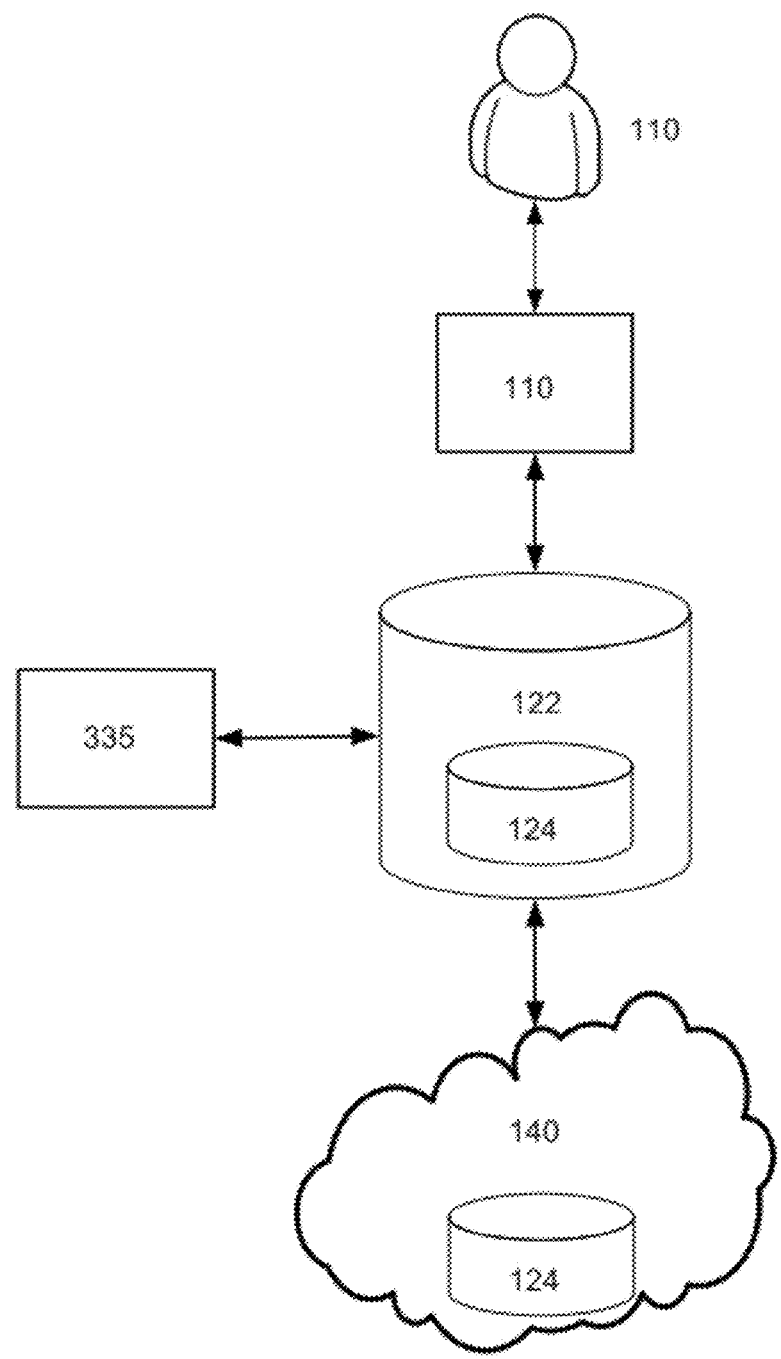
FIG. 7 depicts relationships of a look-aside database signing arrangement according to further aspects of the invention.

Turning to the previously mentioned "took-aside" approach, aspects of such systems and methods are shown in FIG. 7. As shown in FIG. 7, a look-aside approach may be performed with a single registry database 122 and an asynchronous process 335 that will populate the single registry database 122 (source of truth) with the DNSSSEC data, which may then be incrementally published out to DNS 140. The "lookaside" approach may include modifying the DNS servers to apply additional rules, such as, holding certain pending transactions, and only answering with the requested data after the pending DNSSEC changes have been made in registry database 122.

The look-aside approach need not add a new resolution database but, instead, may create, for example, a set of look-aside tables 124 in both the registry database 122 and replicated to the DNS servers. The registry service 335 may include additional logic to initially populate the look-aside with pending information to be processed by the DNSSEC portion of process 335. Process 225 may process all pending look-aside transactions in order to sign and manage the DNSSEC records written back to the registry database 122. The DNS servers may be configured to not answer to client queries for DNS records that have changes pending. The DNS servers may be aware of pending changes, for example, based on information in look-aside tables 124, and may be cleared to return data, for example, by the process 335 marking the look-aside records as complete, and/or recognizing that the look-aside records have been removed.

One advantage of the look-aside approach is that it does not require duplicate information with a second resolution database. Additionally, with the look-aside approach, non-DNSSEC transactions may not impacted by DNSSEC processing since they may propagate to the DNS servers as they did before. For example, an outage of DNSSEC processing does prevent the non-DNSSEC updates.

Figure 8:
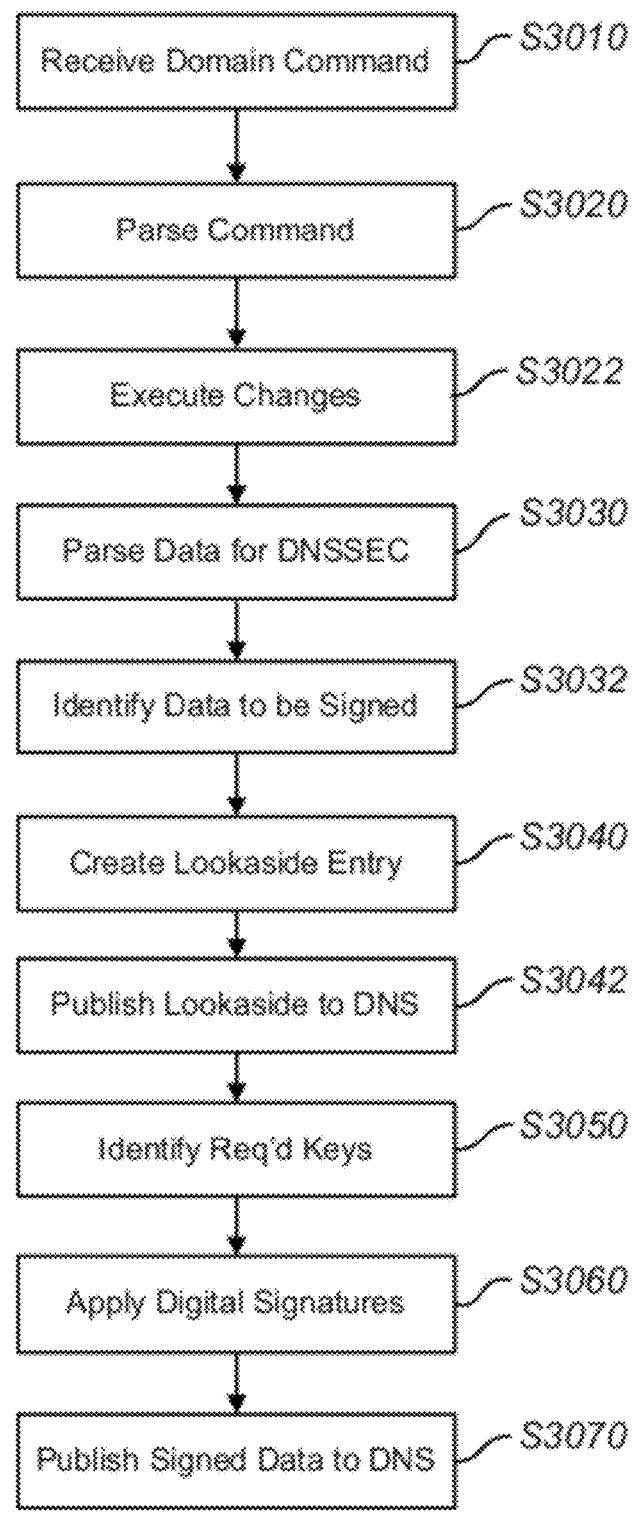
FIG. 8 depicts an exemplary process flow for a look-aside database signing process according to further aspects of the invention.
Figure 9:
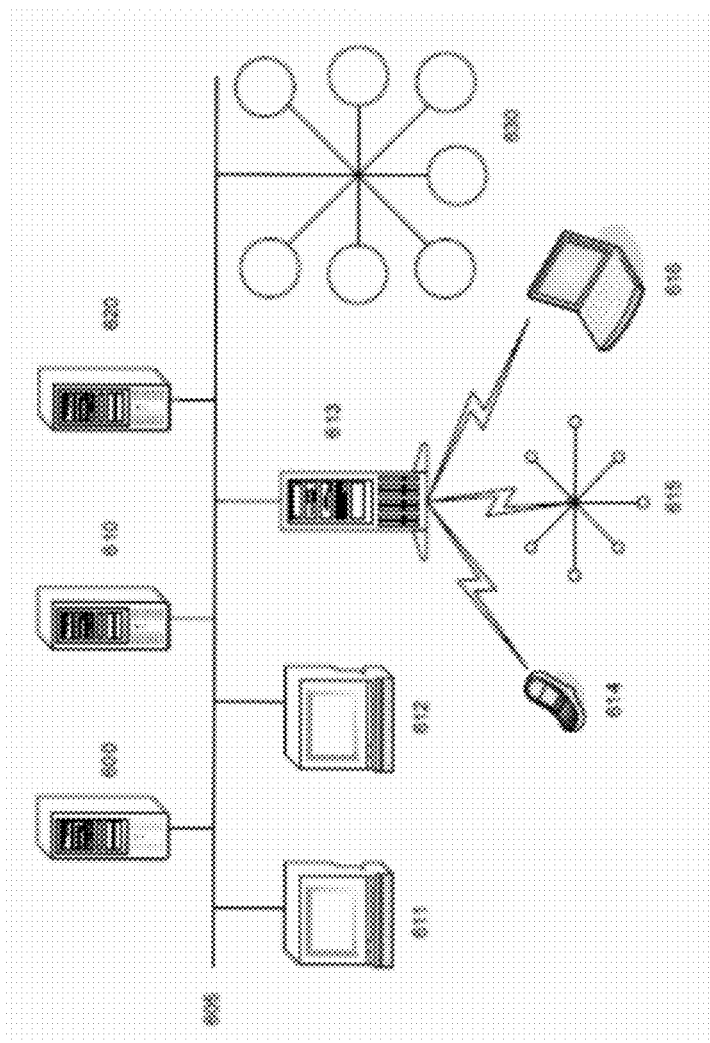
FIG. 9 depicts an exemplary computer network architecture as may be used in embodiments of the invention.

Aspects of an exemplary look-aside approach are generally shown in FIG. 8. It should be noted that, unless specifically described as occurring before, or after, some other step, the steps depicted in FIG. 8 may take place in various orders, and/or contemporaneously, without departing from the scope of the invention.

The method may begin with S3010 in which a domain command, e.g., an add, modify and/or delete command, is received. The domain command may be parsed in S3020 to identify for example, the domain to which the command applies, the applicable TLD, the type of command, any DNS changes, etc. The method may continue with S3022.

In S3022, changes that have been identified in the domain command may be processed for execution, without processing related digital signature data. This may include committing to a registry database the data resulting from the operation, minus any digital-signature data.

In S3030 and S3032, exemplary systems such as provisioning system 110 shown in FIG. 5, may identify DNSSEC data that will be added and/or changed and/or needs to be signed or resigned based on the changes to be made, or already made, as a result of the domain command. This may involve, for example, parsing commands, operations, and/or data for DNSSEC-related changes and identifying the DNSSEC data that needs to be signed and/or resigned.

In S3040, a database entry may be created, e.g., as part of a new or existing look-aside table, indicating that there are pending DNSSEC changes related to the domain command.

In S3042, the database entry may be published to the DNS, e.g., as part of a new, or update to an existing, look-aside table.

In S3050, appropriate DNSSEC keys, signature protocols, and/or appropriate HSMs, may be identified based on the data that needs to be signed. Such determinations may be made based on various factors, including, for example, the domain and/or TLD of the domain, in which the data resides.

In S3060, DNSSEC data may be signed, for example, by one or more HSMs e.g., HSMs 344, 348 shown in FIG. 2, or HSMs included in the provisioning system 110 shown in FIG. 1. As the DNSSEC data is signed, the changes may be persisted to the resolution database, e.g. the downstream resolution database 222.

In S3070, the newly-signed DNSSEC data may be published to the DNS. Additionally, the database entry may be cleared, e.g., by clearing an entry in a look-aside table, or deleting a look-aside table. The changes to the look-aside table may also be published to the DNS.

In embodiments, a DNSSEC engine may also be configured to provide a coherent, stable image of the resolution system's data at all times, and may contain further optimization algorithms for skipping unprocessed events when those events become obsolete by later events (e.g., recognizing that there is no need to process queued DNSSEC events for a domain whose most recent event results in it being deleted from the registry system altogether).

Embodiments of the present invention can include systems for implementing the described methods, as well as computer-readable storage medium coded with instructions for causing a computer to execute the described methods. For example, as shown in FIG. 8, server systems such as servers 600, 610, and/or 620, including at least a processor, a memory and an electronic communication device (not shown), may be configured to receive, identify, respond to and/or act on a request, such as those described herein, received aver the network 605, such as the Internet. Any of servers 600, 610, and/or 620 may be operated by, for example, an Internet hosting provider, a registrar, and/or a registry as described further herein, and may be in communication with any number of recursive DNS servers generally represented by web devices 630. As described herein, recursive servers 630 may cache DNS-related data for domains of the hosting providers, registrars, and/or registries operating servers 600, 610 and 620.

Requests to update DNS data for a domain may originate from, for example, a registrar, DNS service provider, or registrant, via various systems such as, for example, computers 611, 612, via separate server 613 which may be in wireless or other communication with mobile device(s) 614, picocell network devices 615, mobile computer 616, or any other network-capable device with the requisite functional capabilities.

The various communications, transmissions, and related functions described herein may be accomplished, for example, via the network 605, and the results of the described processing performed by server systems such as servers 600, 610 and 620, may be displayed, stored and/or distributed according to known techniques. The network 605 may include any number of communication components including wired, cellular, satellite, optical and/or other similar communication links.

The servers 600, 610 and 620, and computers 611, 612, may include any number of processors (not shown) that are coupled to storage devices including a first storage (not shown, typically a random access memory, or "RAM"), second storage (not shown, typically a read only memory, or "ROM"). Both of these storage devices may include any suitable type of computer-readable media, including non-transitory storage media such as flash drives, hard disks, floppy disks, magnetic tape, optical media such as CD-ROM disks, and/or magneto-optical media. A mass storage device (not shown) may also be used to store programs, data and the like and is typically a secondary storage medium, such as a hard disk that is slower than primary storage. It will be appreciated that the information retained within the mass storage device, may, in appropriate cases, be incorporated in standard manner as part of primary storage as virtual memory. A specific mass storage device such as a CD-ROM may also pass data uni-directionally to the processor.

The servers 600, 610 and 620, and computers 611, 612, may also include an interface that includes one or more input/output devices such as such as video monitors, track balls, mice, keyboards, microphones, touch-sensitive displays, transducer card readers, magnetic or paper tape readers, tablets, styluses, voice or handwriting recognizers, or other known input devices, including other computers. The servers 600, 610 and 620, and computers 611, 612, may be coupled to a computer or other electronic communication network 605 using a network connection. The network 605 can connect various wired, optical, electronic and other known networks to exchange information among servers 600, 610 and 620, computers 611, 612, separate server 613, mobile device(s) 614, picocell network devices 615, mobile computer(s) 616, recursive servers 630, and any other devices with similar functionality. With such a network connection, it is contemplated that the servers 600, 610 and 620, and computers 611, 612 and the processors therein may receive information from the network 605, or may output information to the network 605 in the course of performing the above-described method steps. The above-described devices and materials will be familiar to those of skill in the computer hardware and software arts and need not be individually or exhaustively depicted to be understood by those of skill in the art. The hardware elements described above may be configured (usually temporarily) to act as one or more modules for performing the operations described above.

In addition, embodiments of the present invention further include computer-readable storage media that include program instructions for performing various computer-implemented operations as described herein. The media may also include, alone or in combination with the program instructions, data tiles, data structures, tables, and the like. The media and program instructions may be those specially designed and constructed for the purposes of the present subject matter, or they may be of the kind available to those having skill in the computer software arts. Examples of computer-readable storage media include magnetic media such as flash drives, hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The description given above is merely illustrative and is not meant to be an exhaustive list of all possible embodiments, applications or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments.

What is claimed is:

1. A method of performing DNSSEC signing at a registry comprising:
   receiving a domain command from a requester, the domain command including an identifier of a domain;
   executing the received domain command with respect to data stored by the registry for the domain;
   identifying DNSSEC data changes;
   as part of an individual transaction including the execution of the domain command, sign DNSSEC records for the domain based on the identified DNSSEC data changes using a private key of an authoritative server;
   committing the transaction at the registry; and
   propagating the committed transaction to the DNS infrastructure.

2. The method of claim 1, wherein the domain command includes one or more DNSSEC Delegation Signer (DS) elements.

3. The method of claim 1, wherein the domain command includes one or more DNSKEY elements that generates one or more associated DNSSEC Delegation Signer (DS) records.

4. The method of claim 1, further comprising incrementally publishing the signed DNSSEC records to a separate server.

5. The method of claim 4, wherein the signed DNSSEC records are incrementally published to a plurality of separate DNS servers.

6. The method of claim 1, wherein the domain is at least a second level domain under a Top Level Domain of the registry.

7. The method of claim 1, wherein the method is performed for domains from a plurality of registrars by an authoritative server of the registry.

8. The method of claim 1, wherein the signing of DNS records is performed for at least two domains from a plurality of registrars by an authoritative server of the registry.

9. The method of claim 1, wherein the signing of DNS records is performed by a plurality of signing servers for the registry.

10. The method of claim 1, wherein the domain command is at least one of an add, an update, and a delete command for the domain.

11. The method of claim 1, further comprising committing changes to NSEC or NSEC3 chains based on the at least one of add, update, and delete command.

12. A DNSSEC signing system for a registry comprising:
    a processor; and
    a storage device including computer readable code that, when executed by the processor, causes a signing server of a registry to act as an authoritative server to:
       receive a first command from a requester to at least one of add, update, or delete a DNSSEC-related domain name supported by the registry;
       execute instructions from the first command to add, update, or delete data stored in a registry database;
       as part of an individual transaction including the execution of the instructions from the first command, generate a digital signature based on the add, update, or delete changes;
       commit the digital signature to a registry resolution database.

13. The system of claim 12, wherein the domain is at least a second level domain under a Top Level Domain of the registry.

14. The system of claim 12, wherein the processor is configured to sign DNS records for at least two domains from a plurality of registrars.

15. The system of claim 12, wherein the processor is further configured to incrementally publish the signed DNSSEC records to a plurality of separate DNS servers.

16. The system of claim 12, further comprising a plurality of signing servers configured to sign DNS records for the registry.

17. The system of claim 12, wherein the processor is further configured to commit changes to NSEC or NSEC3 chains based on the at least one of add, update, and delete command.

18. A DNSSEC signing system for a registry comprising:
    a processor; and
    a storage device including computer readable code that, when executed by the processor, causes a signing server of a registry to act as an authoritative server to:
       receive a first command from a requester to at least one of add, update, or delete a DNSSEC-related domain name to, in, or from the registry;

execute instructions from the first command to add, update, and/or delete data stored in a registry database, wherein the execution does not include applying digital-signature data;

report to the requester that the instructions have been executed;

generate a digital signature based on the add, update, and/or delete changes; and commit the digital signature to a registry resolution database.

19. The system of claim 18, wherein non-DNSSEC changes and DNSSEC changes are published by the system asynchronously to the DNS.

20. The system of claim 19, wherein the processor is further configured to commit changes to NSEC or NSEC3 chains based on the add, update, and/or delete changes.

21. A DNSSEC signing system for a registry comprising:
a processor; and
a storage device including computer readable code that, when executed by the processor, causes a signing server of a registry to act as an authoritative server to:

receive a first command from a requester to at least one of add, update, or delete a DNSSEC-related domain name to, in, or from the registry;

execute instructions from the first command to add, update, and/or delete data stored in a registry database, wherein the execution does not include applying digital-signature data;

generate a database entry indicating pending DNSSEC changes related to the first command;

generate a digital signature based on the add, update, and/or delete changes; and clear the database entry.

22. The system of claim 21, wherein the processor is further configured to publish the database entry to the DNS.

23. The system of claim 21, wherein the processor is further configured to commit changes to NSEC or NSEC3 chains based on the add, update, and/or delete changes.

* * * * *